United States Patent
Wong

(10) Patent No.: US 9,481,575 B2
(45) Date of Patent: Nov. 1, 2016

(54) METHOD FOR PRODUCING ELECTROLYZED WATER

(75) Inventor: Siu Ming Wong, Kwai Chung (HK)

(73) Assignees: Tze Kei Choi, Hong Kong (HK); Tsung Pin Yao (TW)

( * ) Notice: Subject to any disclaimer, the term of this patent is extended or adjusted under 35 U.S.C. 154(b) by 346 days.

(21) Appl. No.: 13/441,953

(22) Filed: Apr. 9, 2012

(65) Prior Publication Data

US 2012/0255866 A1   Oct. 11, 2012

(30) Foreign Application Priority Data

Apr. 8, 2011   (TW) .............................. 100112200 A

(51) Int. Cl.
| | |
|---|---|
| *C01B 11/04* | (2006.01) |
| *C02F 1/461* | (2006.01) |
| *C25B 1/26* | (2006.01) |
| *C25B 15/08* | (2006.01) |

(52) U.S. Cl.
CPC ............. *C01B 11/04* (2013.01); *C02F 1/4618* (2013.01); *C25B 1/26* (2013.01); *C25B 15/08* (2013.01); *Y02E 60/366* (2013.01)

(58) Field of Classification Search
CPC ....... C02F 1/4618; C25B 1/26; C25B 15/08; C25B 1/22; Y02E 60/366
USPC .............. 204/228.3, 270; 205/335, 556, 620, 205/742; 423/473, 486
See application file for complete search history.

(56) References Cited

U.S. PATENT DOCUMENTS

| | | | | |
|---|---|---|---|---|
| 4,256,552 | A * | 3/1981 | Sweeney ........................ | 205/511 |
| 4,361,471 | A * | 11/1982 | Kosarek ..................... | 210/748.2 |
| 2006/0283808 | A1* | 12/2006 | Kadlec et al. ................ | 210/746 |
| 2009/0071843 | A1* | 3/2009 | Miyashita et al. ........... | 205/746 |
| 2010/0288626 | A1* | 11/2010 | Kuan et al. ................ | 204/228.1 |
| 2012/0073983 | A1* | 3/2012 | Tomita et al. ................ | 205/556 |

FOREIGN PATENT DOCUMENTS

CN   101899672   12/2010

* cited by examiner

*Primary Examiner* — Steven A. Friday

(57) ABSTRACT

This invention relates to a method for producing electrolyzed water. Firstly, HCl is injected into an area for electrolysis provided with a negative and positive electrode plate respectively on its two inner sides and several small-sized electrolyzers. Then water is led into an area for water transport communicating with an electrolytic cell compartment by a retaining valve. Herein, electrolytic reaction occurs in the area for electrolysis. During such process, when the positive and negative electrode plates are electrified, HCl is decomposed to chlorine and hydrogen bubbles, which float up and store into a gas buffer area. For the pressure difference between the electrolytic cell compartment and the cell compartment for water transport, the chlorine and hydrogen in the gas buffer area enter the cell compartment for water transport through the retaining valve and form HClO with high stable concentration, high production efficiency and environmental friendly functions of sterilization and disinfection.

7 Claims, 5 Drawing Sheets

1

METHOD FOR PRODUCING ELECTROLYZED WATER

FIELD OF THE INVENTION

The present invention provides a method for producing electrolyzed water. In particular, the present invention provides operation steps for preparing hypochlorous water technically, wherein an electrolysis device is disposed with an area for water transport and an area for electrolysis, and the hypochlorous water is produced by mixing the water with chlorine, which is produced from the electrolysis of hydrochloric acid and passes through a retaining valve thereafter.

BACKGROUND OF THE INVENTION

The so-called hypochlorous water is an aqueous solution obtained during the electrolytic process of hydrochloric acid or saline solution, of which the main component is hypochlorous acid. It is widely used as oxidizer, bleach, external fungicide and disinfector. The principle of the device for preparing electrolyzed water is as follows: saline solution (NaCl) or hydrochloric acid (HCl) is placed in an electrolytic cell for electrolysis; after that, the yielded chlorine is mixed with water to produce hypochlorous water. However, since the common electrolytic cell is simply provided with a positive plate and a negative plate on the left and right side inside, during the electrolytic process, the concentration of electrolyte in the bottom is higher than that in the upper layer, which results in bad electrolytic efficiency. Moreover, during the electrolytic process, when high current passes through electrolytic strips, it causes a production of heat and an increase in the impedance of the electrolytic strips, thereby reducing the flow of electrical current and further affecting the output of chlorine. Furthermore, a little of chlorine is not mixed with the water in their mixing process, thus affecting the production efficiency of the hypochlorous water.

Furthermore, a general electrolyzer in a machine for electrolyzing water cannot stand excess water pressure for the reason that if the water stream is too strong, not only the electrolytic efficiency is not enough, but also the electrolyzer is easy to break. So, an additional reducing valve is arranged at the water intake of the general electrolyzer to assure the electrolysis quality. But such solution brings about both increased installation cost and complex installation process.

Therefore, aiming at the main problems in the common structure, it is the goal and direction for those skill in the relevant art to make great efforts to develop and break through and the expectation of consumers that how to develop a kind of innovative structure with more ideal practicability.

For this reason, aiming at the goal described above, inventors eventually come up with the present invention with identified practicability after detailed design and careful evaluation.

SUMMARY OF THE INVENTION

The following technical problems are to be solved: since the common electrolytic cell is simply provided with a positive plate and a negative plate on the left and right side inside, during the electrolytic process, the concentration of electrolyte in the bottom is higher than that in the upper layer, which results in bad electrolytic efficiency. Moreover, during the electrolytic process, when high current passes through electrolytic strips, it causes a production of heat and an increase in the impedance of the electrolytic strips, thereby reducing the flow of electrical current and further affecting the output of chlorine. Furthermore, a little of chlorine is not mixed with the water in their mixing process, thus affecting the production efficiency of the hypochlorous water. Additionally, a general electrolyzer in a machine for electrolyzed water cannot stand excess water pressure for the reason that if the water stream is too strong, not only the electrolytic efficiency is not enough, but also the electrolyzer is easy to break. So, an additional reducing valve is arranged at the water intake of the general electrolyzer to assure the electrolysis quality. But such solution brings about both increased installation cost and complex installation process.

Technical characteristics for solving the above-mentioned problems are as follows: a method for producing electrolyzed water is provided, which comprises the following steps: at step 1: injecting hydrochloric acid into an area for electrolysis through an electrolyte inlet, wherein the area for electrolysis is an electrolytic cell compartment inside, on both inner sides of which are respectively provided a negative electrode plate connected to a negative electrode and a positive electrode plate connected to a positives electrode; furthermore, more than one small-sized electrolyzers each of which has an interior electrode plate are provided in the area for electrolysis; wherein the electrolytic cell compartment is not filled with the hydrochloric acid when it is injected thereinto, thus forming a gas buffer area by the residual space; at steps 2: leading running water into an area for water transport through an inlet for water transport; the area for water transport is a cell compartment for water transport inside, which communicates with the electrolytic cell compartment through a retaining valve; besides, a water flow sensor which can adjust an power supply for electrolysis in the area for electrolysis depending on the water flow velocity inside the area for water transport is provide at the inlet for water transport of the area for water transport; at such step electrolytic reaction occurs inside the area for electrolysis; at step 3: during the process of leading the hydrochloric acid into the area for electrolysis, the time the positive electrode plate and the negative electrode plate are electrified, the hydrochloric acid flowing through the small-sized electrolyzer at the bottom of the electrolytic cell compartment is started to be electrolyzed, wherein the spacing between the small-sized electrolyzer is an area for exchanging electrolyte; when the hydrochloric acid flows through the area for exchanging electrolyte and mixes with the hydrochloric acid with different concentrations, the hydrochloric acid will be fully electrolyzed in the area for electrolysis and forms chlorine bubble ($Cl_2$) and hydrogen bubble ($H_2$) on the interior electrode plates; at step 4: when the chlorine bubble and hydrogen bubble accumulate to form certain buoyancy, they float up and are stored into the gas buffer area for standby application; at this moment, due to the pressure difference between the electrolytic cell compartment and the cell compartment for water transport, the pressure in the cell compartment for water transport is lower than that in the electrolytic cell compartment when injecting water into the cell compartment for water transport, thus making the chlorine and hydrogen inside the gas buffer area flow into the cell compartment for water transport where they are mixed with the water to form hypochlorous water (HClO), which flows out through an outlet for water transport. Meanwhile, after the outlet for water transport of the cell compartment for water transport is closed, the electrolysis device can totally stand the water pressure created by the entering of running water, and can protect itself from being broken by the pressure. Based on this, the hypochlorous water with high stable concentration and high production efficiency is produced, which possesses environmental friendly functions of sterilization and disinfection.

When implementing the present invention, the following advantageous effect can be achieved:

(1) In the present invention, several small-sized electrolyzers inside the electrolytic cell compartment of the electrolysis device can solve the problems that the concentration of the electrolyte is non-uniform which is aroused by the fact that there are only a positive and negative electrode plates on the left and right side respectively, and it can achieve an effect of stabilizing and controlling the concentration of the hypochlorous acid as well as reducing the energy consumption during re-production of hypochlorous acid.

(2) In the present invention, the electrolysis device is divided into an area for electrolysis and an area for water transport. The two are connected by a retaining valve and the area for electrolysis is provided with a gas buffer area inside. In this case, the chlorine can be led into the area for water transport in one-way for the pressure difference between the area for electrolysis and the area for water transport, which is able to control the stabilization of exhaust velocity and produce hypochlorous acid with high stable concentration.

(3) In the present invention, an electrolyte sensor provided inside the area for electrolysis of the electrolysis device can control the injection rate of the hydrochloric acid and avoid the excess injection of hydrochloric acid. In this case, the problems caused by the excess injection of the electrolyte in the common electrolysis device can be solved, which includes high current, high temperature and short circuit of the electrolysis device.

(4) In the present invention, a swirl-type blender provided inside the area for electrolysis of the electrolysis device can make the chlorine and water be fully mixed, promote the dissolution of chlorine and get more hypochlorous acid through the reaction above.

(5) In the present invention, a decompressor is not required in the electrolysis device. Meanwhile, after the outlet for water transport of the electrolysis device is closed, the electrolysis device can totally stand the water pressure created by the entering of running water, and can protect itself from being broken by the pressure, in which case an external water outlet can be used to control the on and off of the device. Thus, the purposes of reducing the cost by decreasing the peripheral accessories and increasing the convenience in use can be achieved.

The technology, method and their function utilized in the present invention is described in great detail by way of a preferred embodiment with reference to the accompanying drawings. It is believed that the present invention can be thoroughly and specifically understood from the objective, construction and features mentioned above.

BRIEF DESCRIPTION OF THE DRAWINGS

The present invention will be described in detail with reference to the accompanying drawings and embodiments in the following.

In the drawings.

| | |
|---|---|
| (1) Area for electrolysis | |
| (10) Small-sized electrolyzer | (100) Interior electrode plate |
| (101) Area for exchanging electrolyte | |
| (11) Electrolytic cell compartment | (110) electrolyte inlet |
| (111) Electrolyte pipeline | (113) Peristaltic pump |
| (115) Gas buffer area | (116) Electrolyte sensor |
| (13) Negative electrode plate | (15) Positive electrode plate |
| (2) Area for water transport | |
| (21) Cell compartment for water transport | (210) Inlet for water transport |
| (211) Outlet for water transport | |
| (23) Swirl-type blender | (25) Water flow sensor |
| (30) Retaining valve | |
| (4) Housing | |
| (S1) step 1 | (S2) step 2 |
| (S3) step 3 | (S4) steps 4 |
| (50) External water outlet | |

DETAILED DESCRIPTION OF THE PREFERRED EMBODIMENT

Figure 1:
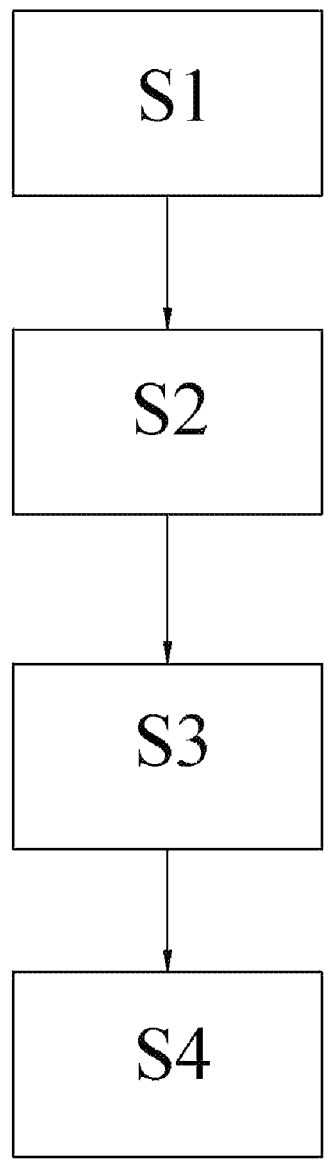
FIG. 1 is a flow chart for operation steps in the present invention.
Figure 2:
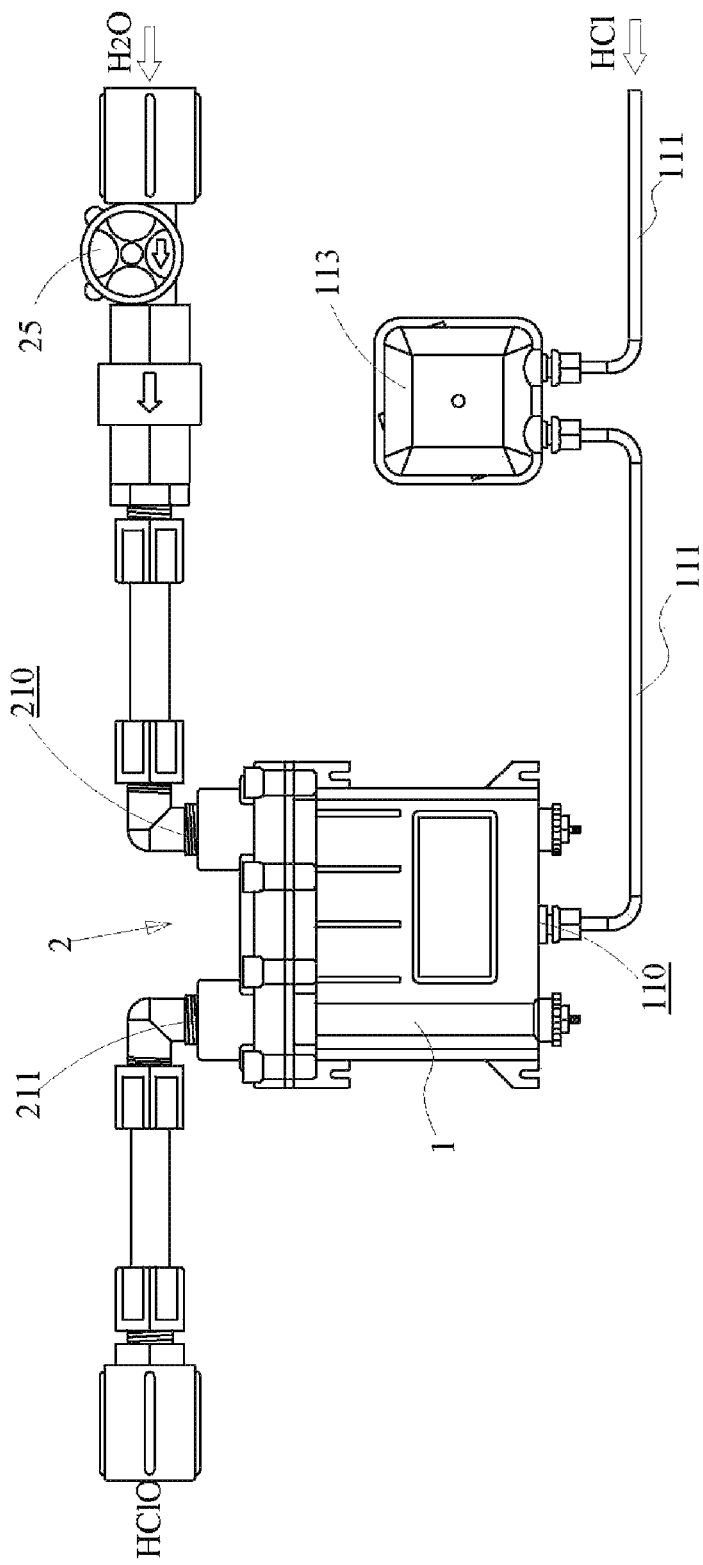
FIG. 2 is a piping diagram of the present invention.
Figure 3:
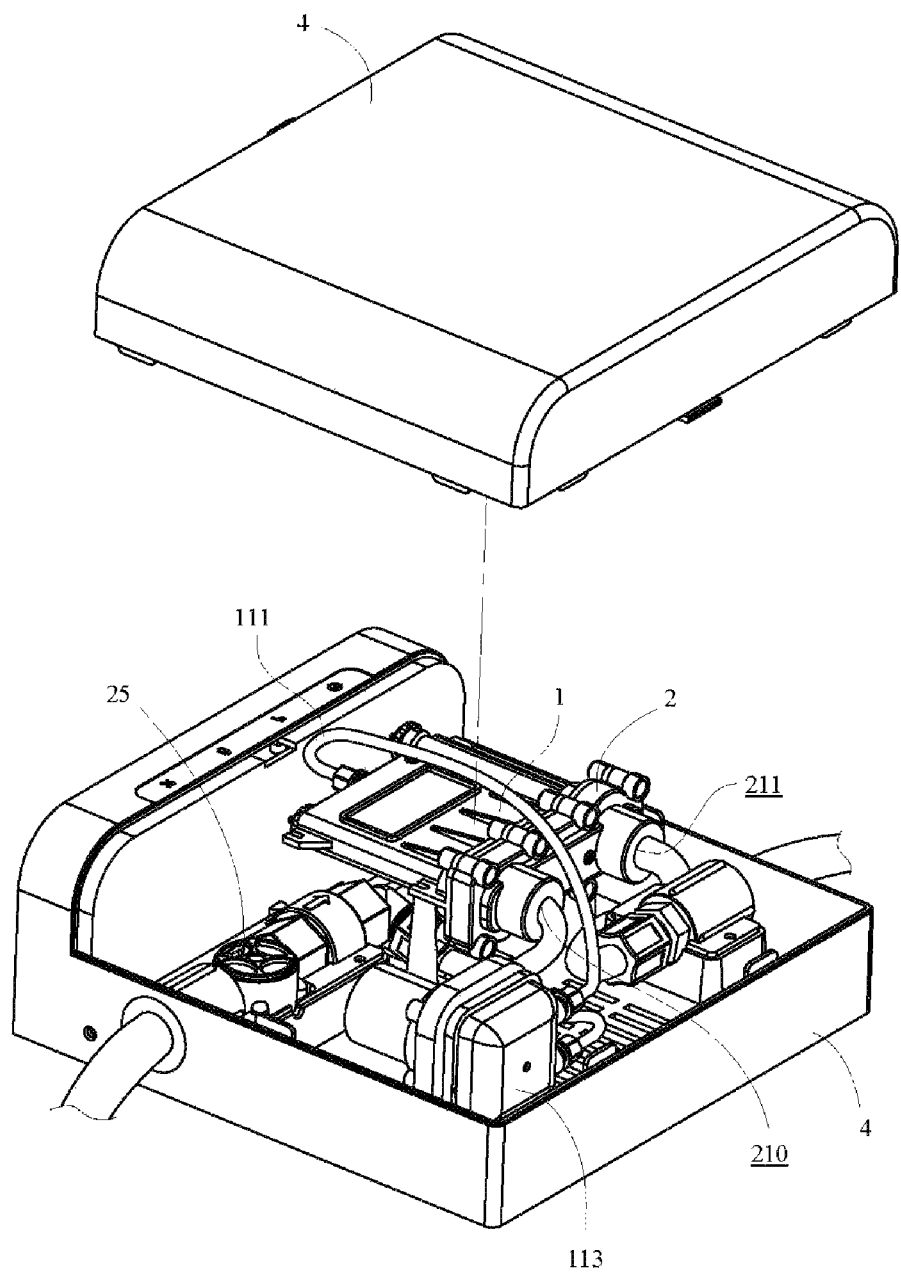
FIG. 3 illustrates a stereo structure in the present invention.
Figure 4:
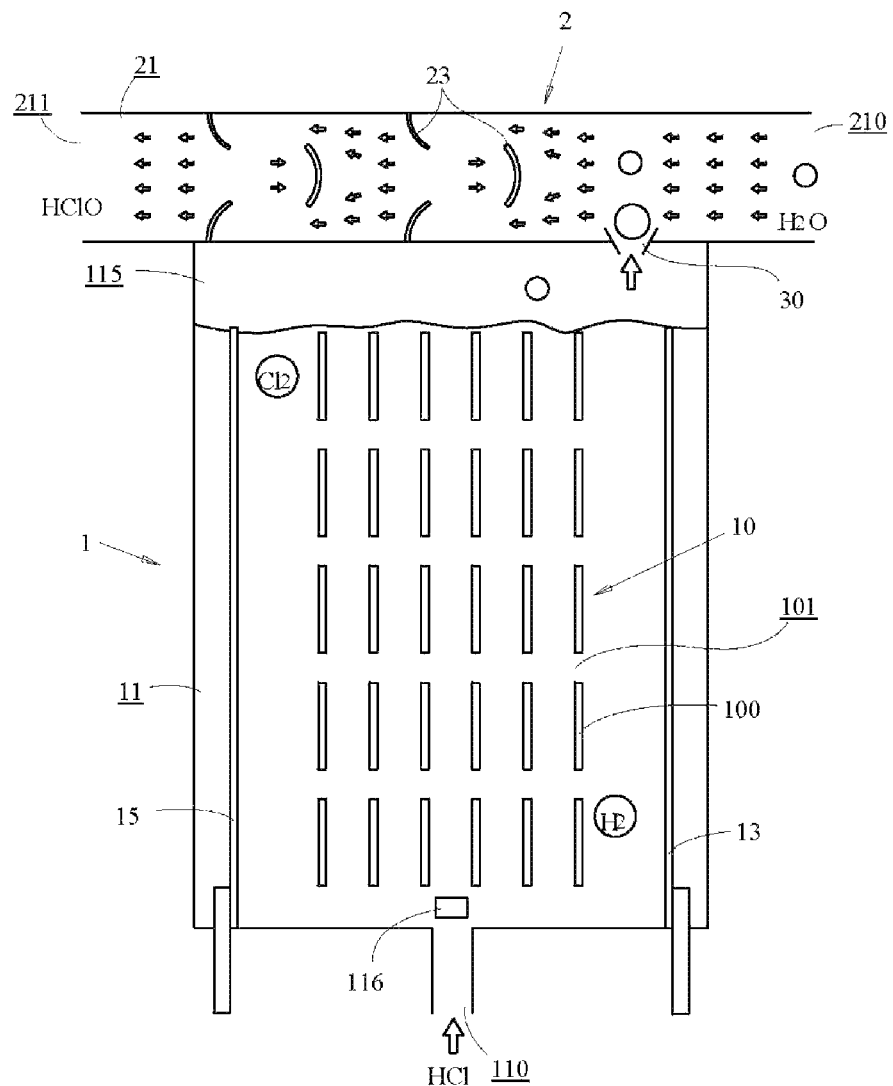
FIG. 4 illustrates an operation principle of the present invention.
Figure 5:
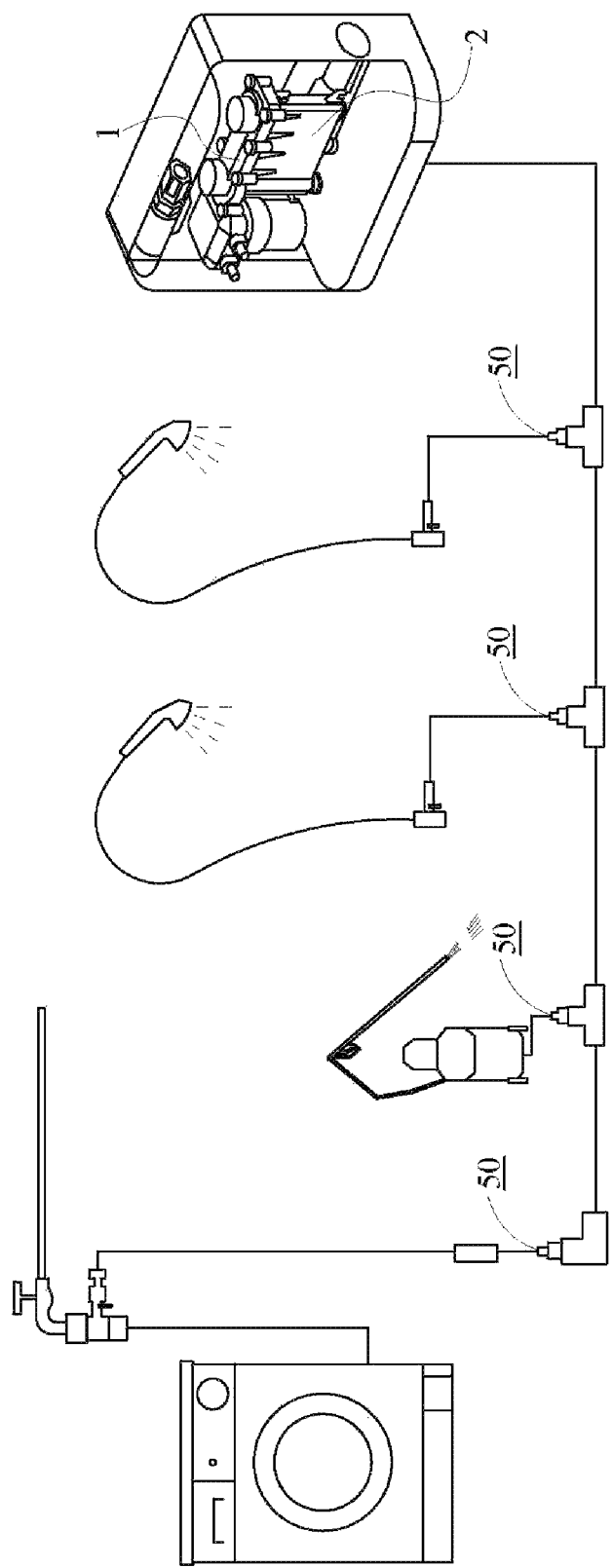
FIG. 5 illustrates the electrolysis device when it is connected to an external water outlet in the present invention.

Referring to FIG. 1 to FIG. 5, the present invention provides a method for producing electrolyzed water, comprising the steps as followed:

Step 1 (S1): injecting hydrochloric acid (HCl) into an area for electrolysis (1) through an electrolyte inlet (110) which is externally connected to an electrolyte pipe (111) and a peristaltic pump (113). The peristaltic pump (113) can lead the electrolyte into the area for electrolysis (1) through the electrolyte pipe (111). The area for electrolysis (1) is an electrolytic cell compartment (11) inside, on both inner sides of which are respectively provided a negative electrode plate (13) connected to a negative electrode and a positive electrode plate (15) connected to a positives electrode. Furthermore, more than one small-sized electrolyzers (10) each of which has an interior electrode plate (100) are provided in the area for electrolysis (1). Wherein, the electrolytic cell compartment (11) is not filled with the hydrochloric acid (HCl) when it is injected thereinto, thus forming a gas buffer area (115) by the residual space Step 2 (S2): leading running water into an area for water transport (2) through an inlet for water transport (210). The area for water transport (2) is a cell compartment for water transport (21) inside, which communicates with the electrolytic cell compartment (11) through a retaining valve (30). Besides, a water flow sensor (25) which can adjust an power supply for electrolysis in the area for electrolysis (1) depending on the water flow velocity inside the area for water transport (2) is provide at the inlet for water transport (210) of the area for water transport (2). At such step, electrolytic reaction occurs inside the area for electrolysis (1).

Step 3: during the process of leading the hydrochloric acid into the area for electrolytic (1), the spacing between the small-sized electrolyzers (10) is an area for exchanging electrolyte (101). In the electrolysis device, the small-sized electrolyzers (10) can either be connected in series or be connected in parallel with each other. When the positive electrode plate (15) and the negative electrode plate (13) are electrified, the hydrochloric acid (HCl) flowing through the small-sized electrolyzer (10) at the bottom of the electrolytic cell compartment (11) starts to be electrolyzed. Specifically, it is electrolyzed in various degrees, resulting in differences in concentration. The hydrochloric acid (HCl) with different concentrations can be exchanged with each other in the area for exchanging electrolyte (101), and can be further mixed into hydrochloric acid (HCl) with only one concentration when entering the small-sized electrolyzer (10) in the upper portion. Finally, the hydrochloric acid (HCl) can be completely electrolyzed in the area for electrolysis (1). Wherein, positive voltage is applied to the side of the interior electrode plate (100) facing the positive electrode plate (15). Chloridion of the hydrochloric acid (HCl) will be attracted onto the surface of the interior electrode plate (100) and catalyzed into chlorine bubbles. On the other hand, negative voltage is applied to the side of the interior electrode plate (100) facing the negative electrode plate (13). Hydrion of the HCL will be attracted onto the surface of the interior electrode slice (100) and catalyzed into hydrogen bubbles. Besides, an electrolyte sensor (116) is provided between the electrolyte inlet (110) and the small-sized electrolyzer (10), which detects whether the hydrochloric acid (HCl) inside the electrolytic cell compartment (16) is enough and can feed back information to control the injection rate of the hydrochloric acid (HCl). Before injecting the hydrochloric acid (HCl) into the electrolystic cell compartment (11) through the electrolyte inlet (110), the electrolyte sensor (116) feeds back information to speed up the injection of the hydrochloric acid (HCl). Since the hydrochloric acid (HCl) reaches the electrolyte sensor (116) through the electrolyte inlet (110), the electrolyte sensor (116) feeds back information to slow down the injection of the hydrochloric acid (HCl) to a normal rate. In this way, many problems caused by injection of excess hydrochloric acid (HCl) can be avoided, including high current, high temperature and short circuit. Furthermore, when the distance between barrels for containing the hydrochloric acid (HCl) is relatively large, it can save time by speeding up the injection of hydrochloric acid (HCl).

Step 4 (S4): when the chlorine bubble and hydrogen bubble accumulate to form certain buoyancy, they float up and are stored into the gas buffer area (115) for standby application. At this moment, due to the pressure difference between the electrolytic cell compartment (11) and the cell compartment for water transport (21), the pressure in the cell compartment for water transport (21) is lower than that in the electrolytic cell compartment (11) when injecting water into the cell compartment for water transport (21), thus making the chlorine ($Cl_2$) and hydrogen ($H_2$) inside the gas buffer area (115) flow into the cell compartment for water transport (21) where they are mixed with the water. Moreover, the area for water transport (2) further comprises a swirl-type blender (23) which can fully mix the water in the cell compartment for water transport (21) with the chlorine ($Cl_2$) from the electrolytic cell compartment (11) to form hypochlorous water (HClO) which flows out through an outlet for water transport (210) at last.

In such device, the area for water transport (2) and the area for electrolysis (1) should be set inside a shell (4).

By doing this, the hydrochloric acid (HCl) can be leaded into the electrolytic cell compartment (11) through the electrolyte pipeline (111) and the peristaltic pump (113). During the leading process, when the positive electrode plate (15) and the negative electrode plate (13) are electrified, the hydrochloric acid (HCl) flowing through the small sized electrolyzer (10) at the bottom of the electrolytic cell compartment (11) starts to be electrolyzed. The hydrochloric acid (HCl) with different concentrations can be exchanged with each other in the area for exchanging electrolyte, thus making the hydrochloric acid (HCl) be completely electrolyzed in the area for electrolysis (1) to achieve an effect of stabilization. In addition, the electrolyte sensor (116) can detect whether the hydrochloric acid (HCl) inside the electrolytic cell compartment (16) is enough and feed back information to control the injection rate of the hydrochloric acid (HCl). In this way, many problems caused by injection of excess hydrochloric acid (HCl) can be avoided, including high current, high temperature and short circuit. When the hydrochloric acid (HCl) is electrolyzed, chlorine bubble ($Cl_2$) and hydrogen bubble ($H_2$) can be produced, which then float up and are stored into the gas buffer area (115) to reserve. At this moment, the electrolytic cell compartment (11) is stored with chlorine, hydrogen and a small amount of dilute hydrochloric acid, so the pressure inside the electrolytic cell compartment (11) is more than or equal to the atmospheric pressure. However, for the reason that the cell compartment for water transport (21) is connected to a running water pipe, the time the outlet for water transport (211) is closed or the running water is stopped to be supplied, the pressure inside the cell compartment for water transport (21) becomes more than or equal to that inside the electrolytic cell compartment (11), and the electrolysis is ceased at the same time. When the outlet for water transport (211) is open, the time the water is injected into the cell compartment for water transport (21), its pressure inside becomes less than that inside the electrolytic cell compartment (11), resulting in that the chlorine and hydrogen inside the gas buffer area (115) enter the cell compartment for water transport (21) through the retaining valve (30) and mix with water to form the hypochlorous water (HClO) which flows out through the outlet for water transport (211). The gas buffer area (115) can control the stabilization of the exhaust velocity. In addition, the additional swirl-type blender (23) can fully mix the chlorine with water and promote the chlorine to dissolve to produce hypochlorous acid with high stable concentration. Furthermore, there is no need to provide a decompressor in the cell compartment for water transport (21). On one hand, it reduces the cost of peripheral accessories; on the other hand, it increases the production amount of hypochlorous water. Additionally, when the outlet for water transport is closed, the electrolysis device of the present invention can stand the high water pressure from the running water. Herein, the high water pressure in the cell compartment for water transport (21) would cause no break thereto. Therefore, the electrolysis device used in the present invention can connect to several external water outlets (50), and can control its on and off directly through the external water outlet, 50, thereby improving the convenience in use. The present invention is simple in structure, and it can produce hypochlorous water with high stable concentration, high production efficiency as well as environmental friendly functions of sterilization and disinfection.

While the present invention has been described with reference to preferred embodiments, it will be understood by those skilled in the art that various changes and modifications may be made without departing from the spirit and scope of the present invention. All such modifications and changes should be within the scope of the present invention.

The invention claimed is:
1. A method for producing electrolyzed hypochlorous acid water, including the following steps:
providing an electrolytic cell compartment as an area for electrolysis, wherein a negative electrode plate and a positive electrode plate are placed inside the electrolytic cell compartment, and the negative electrode plate is connected to a negative electrode, and the positive electrode plate is connected to a positive electrode;

placing more than one interior electrode plates in between the negative electrode plate and the positive electrode plate, which forms more than one small-sized electrolyzers;

injecting hydrochloric acid (HCl) into the electrolytic cell compartment through an electrolyte inlet from a bottom of the electrolytic cell compartment and leaving the electrolytic cell compartment not fully filled with the hydrochloric acid that forms a gas buffer area;

electrifying the negative electrode plate and the positive electrode plate to form chlorine bubbles and hydrogen bubbles with the more than one small-sized electrolyzers, and the chlorine bubbles and hydrogen bubbles flow to the gas buffer area;

leading running water into an area for water transport through an inlet for water transport, wherein the area for water transport is a cell compartment for water transport inside, and is located on a top of the electrolytic cell compartment, which communicates with the electrolytic cell compartment through a retaining valve; and making the chlorine bubbles and hydrogen bubbles inside the gas buffer area flow into the cell compartment for water transport where they are mixed with the water to form hypochlorous acid water (HClO), wherein the pressure in the cell compartment for water transport is lower than that in the electrolytic cell compartment when leading water into the cell compartment for water transport.

2. The method for producing electrolyzed hypochlorous acid water of claim 1, wherein the electrolyte inlet is externally connected to an electrolyte pipeline and a peristaltic pump and the peristaltic pump leads hydrochloric acid into the electrolytic cell compartment.

3. The method for producing electrolyzed hypochlorous acid water of claim 1, further comprising a electrolyte sensor that detects and adjusts the injection rate of the hydrochloric acid inside the electrolytic cell compartment at the electrolyte inlet.

4. The method for producing electrolyzed hypochlorous acid water of claim 1, wherein the area for water transport further comprises a swirl blender to fully mix the water with the chlorine and hydrogen from the electrolytic cell compartment.

5. The method for producing electrolyzed hypochlorous acid water of claim 1, wherein the small-sized electrolyzers are arranged in series with each other.

6. The method for producing electrolyzed hypochlorous acid water of claim 1, wherein the small-sized electrolyzers are arranged in parallel with each other.

7. The method for producing electrolyzed hypochlorous acid water of claim 1, wherein the area for water transport and the area for electrolysis are set inside a housing.

\* \* \* \* \*